(12) United States Patent
Nakata et al.

(10) Patent No.: US 9,401,129 B2
(45) Date of Patent: Jul. 26, 2016

(54) IMAGE PROJECTION DEVICE

(71) Applicants: Otoichi Nakata, Kanagawa (JP); Fumihiro Nakashige, Kanagawa (JP); Shinichi Sumiyoshi, Kanagawa (JP)

(72) Inventors: Otoichi Nakata, Kanagawa (JP); Fumihiro Nakashige, Kanagawa (JP); Shinichi Sumiyoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 45 days.

(21) Appl. No.: 14/330,078

(22) Filed: Jul. 14, 2014

(65) Prior Publication Data
US 2015/0029173 A1    Jan. 29, 2015

(30) Foreign Application Priority Data
Jul. 25, 2013 (JP) ................................. 2013-154989
Mar. 13, 2014 (JP) ................................. 2014-049699

(51) Int. Cl.
| | |
|---|---|
| G09G 5/18 | (2006.01) |
| H04N 5/74 | (2006.01) |
| G06F 3/03 | (2006.01) |
| G06F 3/042 | (2006.01) |
| H04N 9/31 | (2006.01) |

(52) U.S. Cl.
CPC ................ *G09G 5/18* (2013.01); *G06F 3/0304* (2013.01); *G06F 3/0425* (2013.01); *H04N 5/74* (2013.01); *H04N 9/3194* (2013.01)

(58) Field of Classification Search
CPC ......... G09G 5/18; H04N 5/74; H04N 9/3194; G06F 3/005; G06F 3/0304; G06F 3/0308; G06F 3/03542; G06F 3/0386; G06F 3/0425; G06T 3/40
See application file for complete search history.

(56) References Cited

U.S. PATENT DOCUMENTS

| | | | | | |
|---|---|---|---|---|---|
| 5,796,425 | A  * | 8/1998 | Minami | ............... | H04N 9/3182 348/181 |
| 6,677,987 | B1 * | 1/2004 | Girod | .................... | G06F 3/0386 348/171 |
| 7,683,881 | B2 * | 3/2010 | Sun | ...................... | H04N 9/3179 345/156 |
| 2001/0045940 | A1 * | 11/2001 | Hansen | ................. | G06F 3/0386 345/158 |
| 2003/0174163 | A1 * | 9/2003 | Gnanamgari | ......... | G06F 3/0386 715/738 |
| 2003/0189731 | A1 * | 10/2003 | Chang | ................. | G06F 3/03542 358/3.28 |
| 2006/0170874 | A1 * | 8/2006 | Yumiki | .................. | G03B 21/14 353/42 |

(Continued)

FOREIGN PATENT DOCUMENTS

| | | |
|---|---|---|
| JP | 11-271675 | 10/1999 |
| JP | 2005-091176 | 4/2005 |
| JP | 3733915 | 10/2005 |

*Primary Examiner* — Tom Sheng
(74) *Attorney, Agent, or Firm* — Oblon, McClelland, Maier & Neustadt, L.L.P.

(57) ABSTRACT

An image projection device includes: a drive controller that causes generation of light of a specified color tone by a combination of light to be transmitted by a liquid crystal panel to project image data onto a projection plane; an image capturing controller that receives a synchronization signal that specifies a period in which the liquid crystal panel does not transmit light from the drive controller and causes capturing of an image of the projection plane according to the period that is specified by the synchronization signal; an illuminated image detector that detects, from the captured image of the image data, an illuminated image that is illuminated by an illuminating device on the projection plane; and an illuminated image generator that generates projection image data obtained by combining given image data in a position in which the illuminated image is detected.

6 Claims, 11 Drawing Sheets

(56) References Cited

U.S. PATENT DOCUMENTS

| | | | |
|---|---|---|---|
| 2007/0222747 A1* | 9/2007 | Kritt | H04L 12/1827 345/156 |
| 2009/0091532 A1* | 4/2009 | Hockett | G06F 3/0304 345/158 |
| 2011/0025818 A1* | 2/2011 | Gallmeier | G06F 3/017 348/14.07 |
| 2011/0109554 A1* | 5/2011 | Boissier | G06F 3/03545 345/166 |
| 2012/0176311 A1* | 7/2012 | Bittenson | G06F 3/0386 345/158 |
| 2013/0162607 A1* | 6/2013 | Ichieda | G06F 3/0425 345/204 |
| 2013/0300658 A1* | 11/2013 | Endo | G06F 3/0425 345/157 |

\* cited by examiner

FIG.9
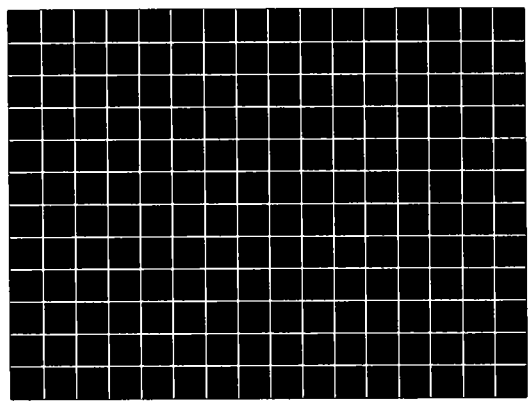
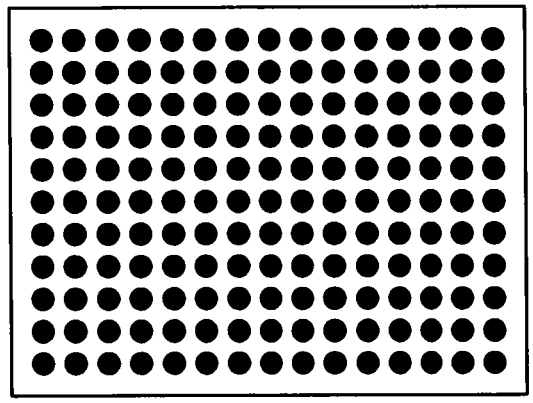

FIG.10
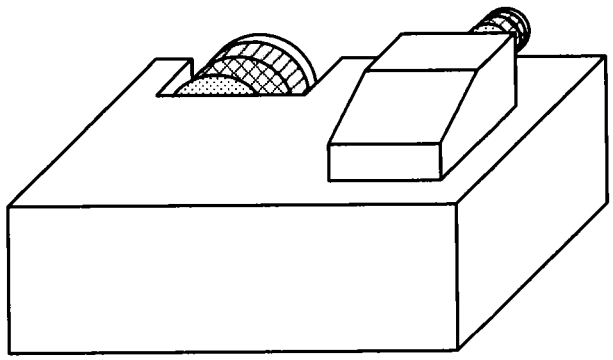
(a)
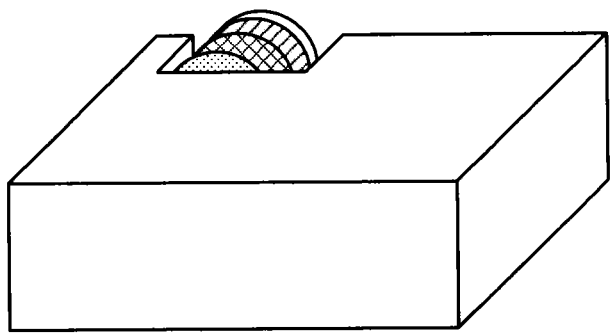
(b)
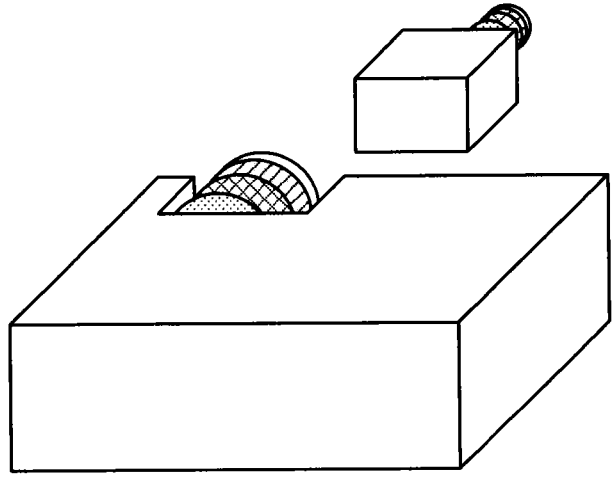
(c)

IMAGE PROJECTION DEVICE

CROSS-REFERENCE TO RELATED APPLICATION(S)

The present application claims priority to and incorporates by reference the entire contents of Japanese Patent Application No. 2013-154989 filed in Japan on Jul. 25, 2013 and Japanese Patent Application No. 2014-049699 filed in Japan on Mar. 13, 2014.

BACKGROUND OF THE INVENTION

1. Field of the Invention

The present invention relates to an image projection device.

2. Description of the Related Art

Projectors project enlarged images, such as letters or graphs, and thus are widely used in presentations for a large number of people, etc. In a presentation, the presenter may point an image that is projected on the screen with, for example, a pointer to give explanations easy to follow. However, directly pointing a projected image with a laser pointer has been a problem in that a desired part cannot be pointed accurately due to trembling of the hand. To deal with such a problem, the technology according to Japanese Laid-open Patent Publication No. 11-271675 has been already known in which a built-in CCD (Charge Coupled Device) camera of a projector detects the spot that is illuminated by a user with a laser pointer and a pointer image is displayed on the same spot as the illuminated spot.

However, detection of a spot that is illuminated with a laser pointer from a video image that is captured by a camera in the conventional manner has a problem in that, when the color or luminance of the laser from the laser pointer is similar to the color or luminance of a projected video image, there is a possibility that the laser from the laser pointer cannot be detected depending on the content of projection.

In view of the above-described problem, there is a need to provide an image projection device that can accurately detect a spot that is illuminated by an illuminating device, such as a laser pointer.

SUMMARY OF THE INVENTION

It is an object of the present invention to at least partially solve the problems in the conventional technology.

According to the present invention, there is provided an image projection device comprising: a drive controller that causes generation of light of a specified color tone by a combination of light to be transmitted by a liquid crystal panel to project image data onto a projection plane; an image capturing controller that receives a synchronization signal that specifies a period in which the liquid crystal panel does not transmit light from the drive controller and causes capturing of an image of the projection plane according to the period that is specified by the synchronization signal; an illuminated image detector that detects, from the captured image of the image data, an illuminated image that is illuminated by an illuminating device on the projection plane; and an illuminated image generator that generates projection image data obtained by combining given image data in a position in which the illuminated image is detected.

The present invention also provides an image projection device comprising: a drive controller that causes generation of light of a specified color tone by a combination of light to be transmitted by a liquid crystal panel to project image data onto a projection plane; an image capturing controller that receives a synchronization signal that specifies a period in which the liquid crystal panel does not transmit light from the drive controller and causes capturing of an image of the projection plane according to the period that is specified by the synchronization signal; a light spot device that causes to generate a light spot around the projection plane from the captured image data; a light spot detector that detects the light spot generated by the light spot device around projection plane; and a light spot image generator that generates projection image data obtained by combining given image data in a position in which the light spot is detected.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 illustrates an exemplary projection pattern according to the embodiment;

FIGS. 10(a), 10(b), and 10(c) illustrate exemplary configurations of a camera unit of the image projection device according to the embodiment;

DETAILED DESCRIPTION OF THE PREFERRED EMBODIMENTS

First Embodiment

Figure 1:
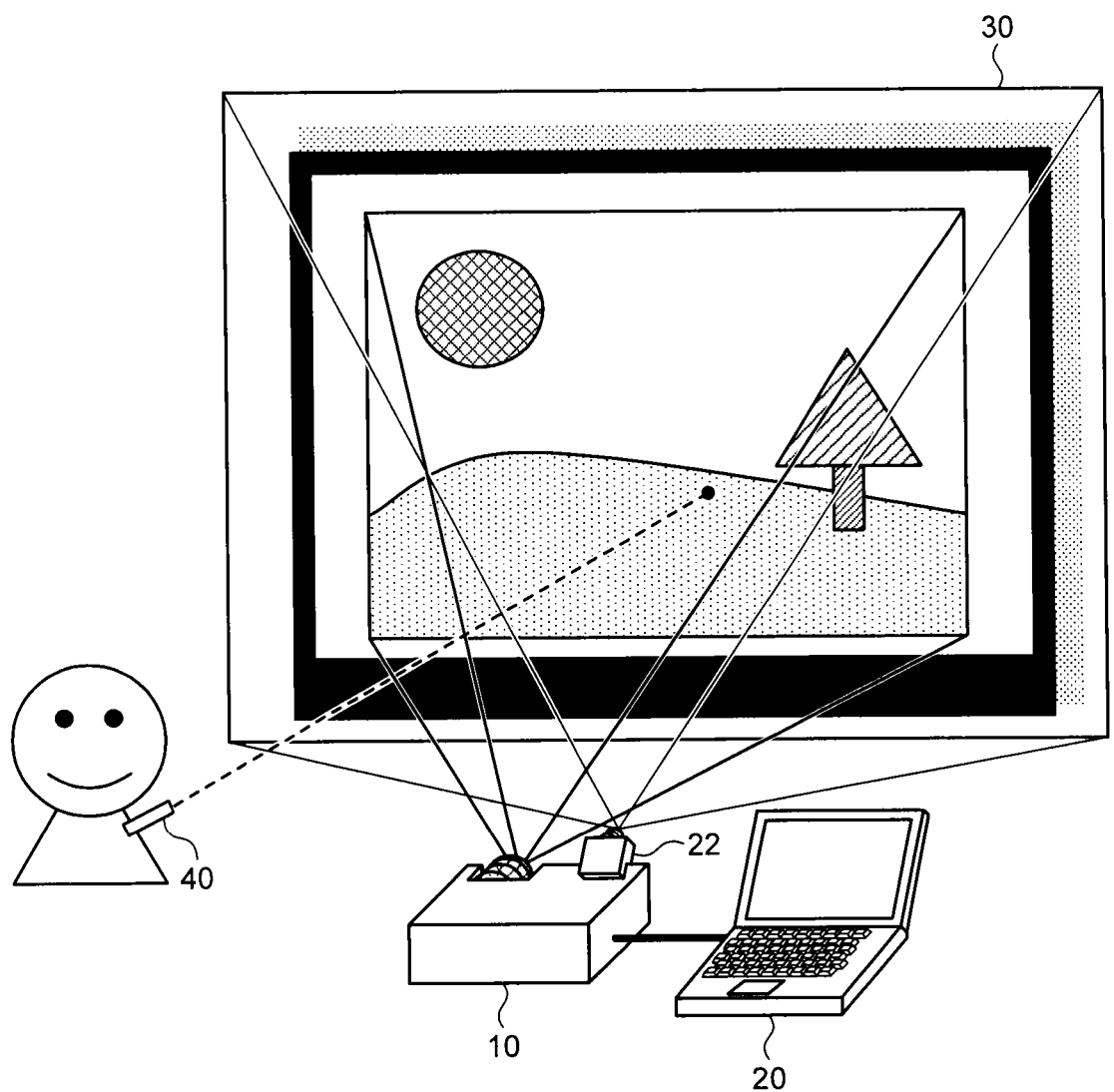
FIG. 1 is a general view of a mode in which an image projection device according to an embodiment of the present invention is used.

An image projection device according to a first embodiment of the invention will be described with reference to the accompanying drawings. FIG. 1 is a general view of an image projection system including an image projection device. An image projection device 10 is connected to an external PC 20 and projects image data, such as a still image or video image, that is input from the external PC 20 onto a screen 30 serving as a projection plane. FIG. 1 illustrates a case where a user uses a laser pointer 40 as an emitting device. A camera unit 22 is connected to the image projection device 10. The camera unit 22 may be provided as external hardware or may be a built-in unit of the image projection device 10.

Figure 2:
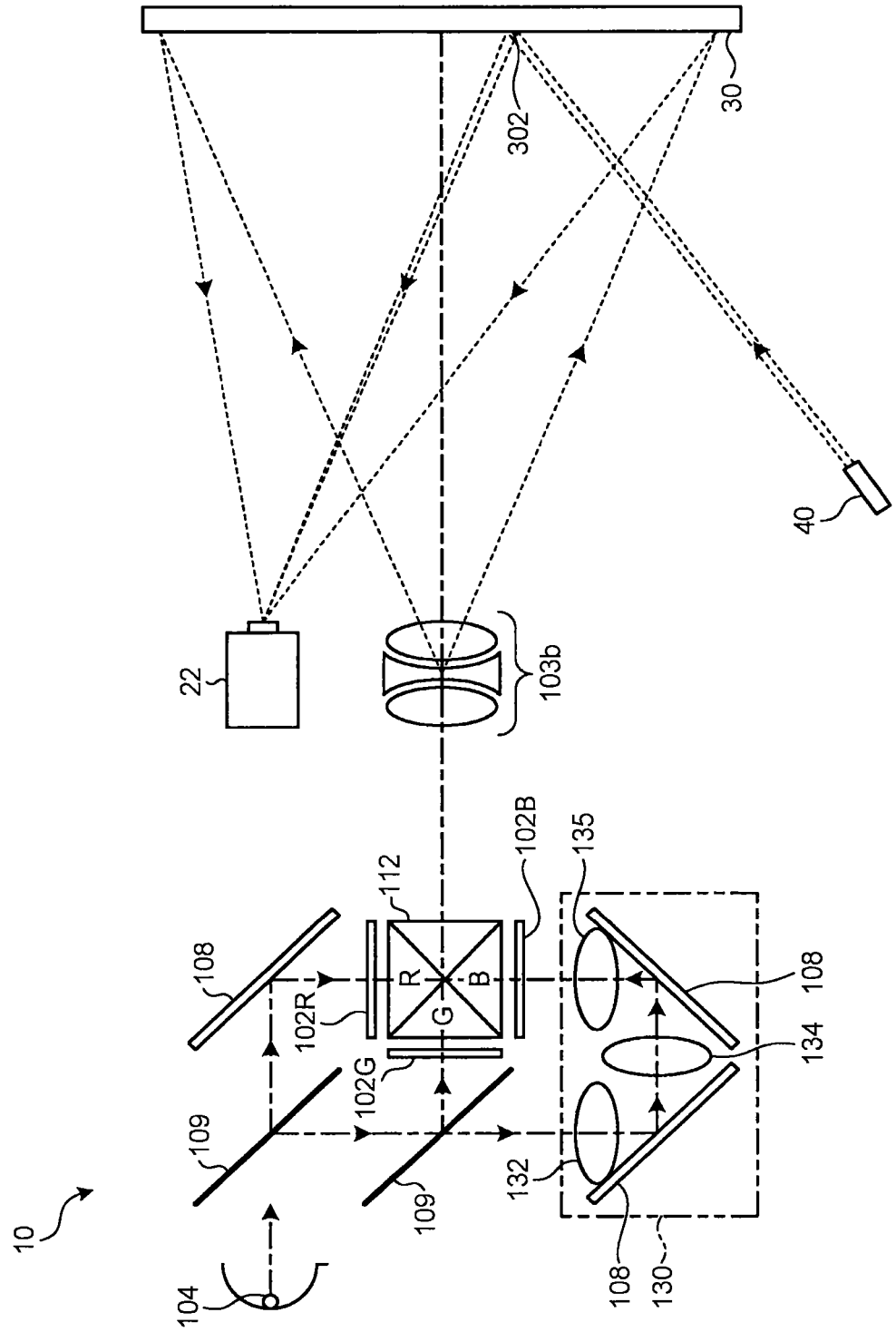
FIG. 2 illustrates an internal configuration of hardware of the image projection device according to the embodiment.

FIG. 2 illustrates a hardware configuration of the image projection device. As illustrated in FIG. 2, the image projection device 10 includes a white light source 104, such as a halogen lamp, that emits white light. The white light emitted from the white light source 104 is divided into three primary colors of R, G, B by three mirrors 108 and two dichroic mirrors 109 that are provided in the image projection device 10. The R light is guided to a liquid crystal display panel 102R and, similarly, the G light is guided to a liquid crystal display panel 102G and the B light is guided to a liquid crystal display panel 102B. The liquid crystal display panel 102R functions as an image forming unit that generates an R primary color image and, similarly, the liquid crystal display panels 102G and 102B function as image forming units that generate G and B primary color images, respectively. The liquid crystal display panels 102R, 102G, and 102B are driven by a drive controller 14 (see FIG. 3) and transmits light in the on state and blocks light in the off state. By controlling on/off of each panel according to the color of an image signal to be generated, an image signal of a desired color can be projected. The optical path of the B light is longer than those of the R light and G light and thus, in order to prevent the loss, the B light is guided via a relay lens system 130 including an incidence lens 132, a relay lens 134, and an emission lens 135.

The light that is modulated by the liquid crystal display panels 102R, 102G, and 102B, i.e., the primary color images, is incident on a dichroic prism 112 in three directions. In the dichroic prism 112, while the R light and the B light are refracted by 90 degrees, the G light goes straight and accordingly a color image is composited from the primary color images. The color image is incident on a lens group 103*b*. The camera unit 22 captures an image of the image that is projected together with a reference line onto the screen 30 and of an illuminated spot 302 that is pointed by the user with the laser pointer 40.

Figure 3:
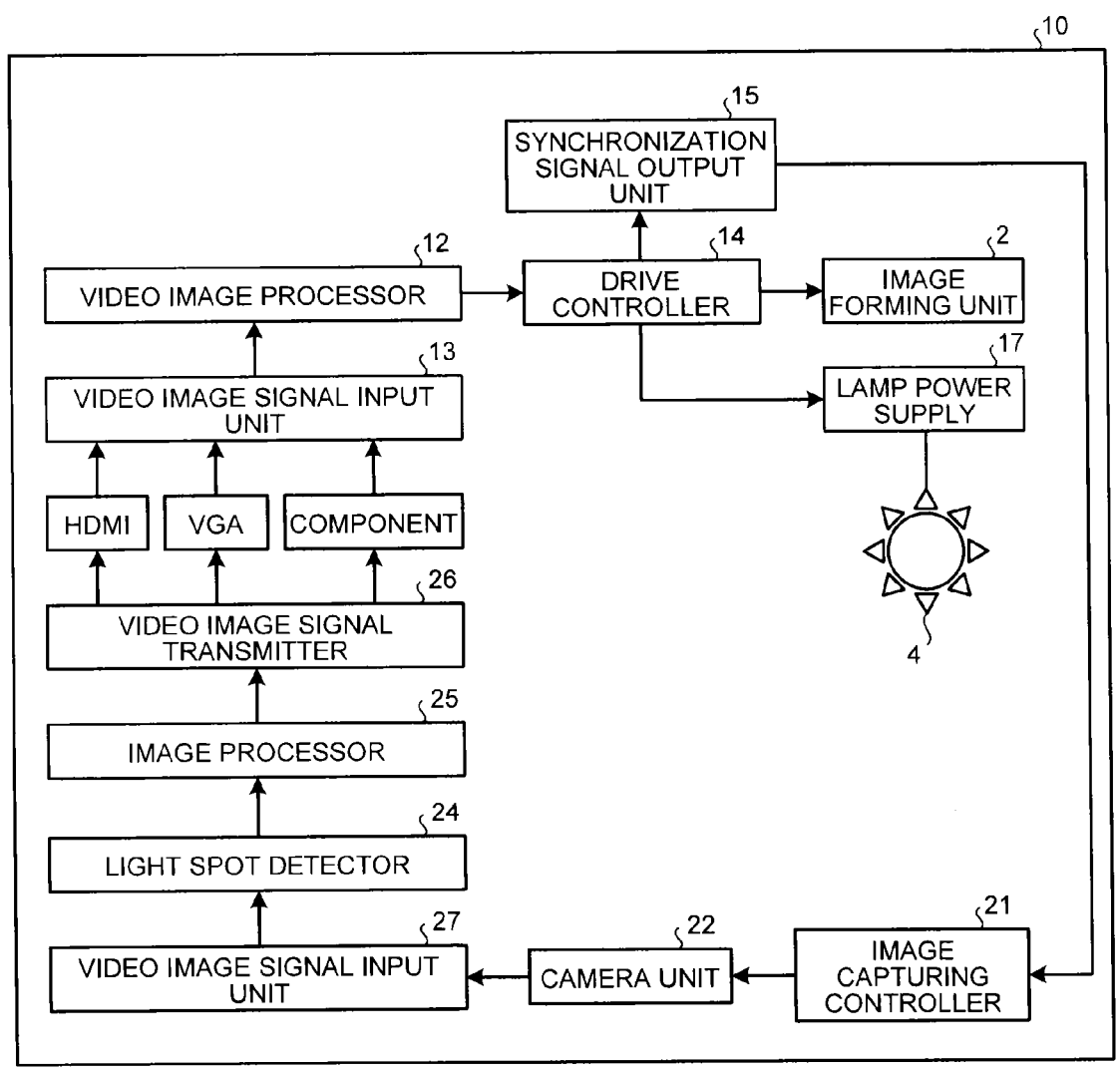
FIG. 3 is a block diagram of a functional configuration of the image projection device according to the embodiment.

FIG. 3 is a block diagram of a functional configuration of the image projection device 10. The image projection device 10 controls input of a video image signal to synchronize emission of light and driving of the image forming unit. As illustrated in FIG. 3, the image projection device 10 includes an image forming unit 2, a light source 4, a video image processor 12, a video image signal input unit 13, the drive controller 14, a synchronization signal output unit 15, an image capturing controller 21, the camera unit 22 (image capturing unit), an light spot detector 24, an image processor 25, a video image signal transmitter 26, and a video image signal input unit 27.

First, digital signals according to, for example, HDMI (trademark), and analog signals, according to, for example, VGA or component signals, are input to the video image signal input unit 13 of the image projection device 10. The video image signal input unit 13 performs a process for processing a video image to RGB or YPbPr signals, etc. according to the input signals. If the input video image signal is a digital signal, the video image signal input unit 13 converts the digital signal into a bit format that is defined by the video image processor 12 according to the number of bits of the input signal. If the input signal is an analog signal input, the video image signal input unit 13 performs DAC processing for performing digital sampling on the analog signal, etc. and inputs the RGB or YPbPr format signal to the video image processor. Image data of a projected image that is captured by the camera unit 22 is also input to the video image signal input unit 13.

The video image processor 12 performs digital image processing, etc. according to the input signal. Specifically, proper image processing is performed according to the contrast, brightness, chroma, hue, RGB gain, sharpness, scaler function for scaling up/down, or the characteristics of the drive controller 14. The input signal on which the digital image processing has been performed is passed to the drive controller 14. The video image processor 12 can also generate image signals of an arbitrarily specified or registered layout.

The drive controller 14 determines conditions on driving the image forming unit 2 that selects whether or not to cause the liquid crystal display panels to transmit light according to the image data and driving a lamp power supply 17 that controls the current for driving the lamp and issues a drive instruction to the image forming unit 2 and the lamp power supply 17. In this manner, the drive controller 14 switches between on and off of transmission of light through the liquid crystal display panels to generate light of a desired color tone.

The processing performed by the image projection device 10 includes a flow of processing for capturing an image of a projection pattern that is projected from the image projection device 10 and calculating a projective transformation coefficient from the difference between the position of a set of coordinates in the projected data of the captured image and the position of a set of coordinates in image data and a flow of processing for detecting an illuminated spot. First, a flow of processing for capturing an image of a projected projection pattern will be described.

The image capturing controller 21 receives a synchronization signal from the synchronization signal output unit 15 and issues an image capturing instruction to the camera unit 22. The drive controller 14 may issue an image capturing instruction to the camera unit 22 according to the synchronization signal according to the image capturing timing. In other words, the drive controller 14 may be configured to serve also as an image capturing controller. When the image that is captured by the camera unit 22 is input to the video image signal input unit 27, the video image signal input unit 27 performs shading correction, Bayer conversion, color correction etc. on the captured camera image to generate RGB signals. The video image processor 12 generates the projection pattern illustrated in FIG. 4 and the image projection device 10 projects the projection pattern.

The camera unit 22 captures an image of the scene resulting from projection of the projection pattern. The image capturing system employed by the camera unit 22 includes a global shutter system and a rolling shutter system. The global shutter system exposes all pixels simultaneously and and requires, for each pixel, a circuit more complicated than that for the rolling shutter system. However, there is an advantage that an image can be captured by exposing all the pixels at a time. In contrast, the rolling shutter system can perform sequential scanning exposure with implementation of a simple circuit, and can capture an image by scanning. However, the image capturing timing differs for each pixel and thus, when an image of an object moving fast is captured, distortion etc. may occur. It is preferable that the shutter speed of the camera unit 22 be controlled by the drive controller 14. From the length of the blank period to be described below, the drive controller 14 determines and controls a shutter speed that is required for image capturing for the period between timings that are specified by the synchronization signal.

On the basis of the captured image, the light spot detector 24 acquires a set of coordinates of each lattice point on the projection plane on which the image is currently projected. The image processor 25 calculates a projective transformation coefficient H that associates the coordinates (x,y) in the video image signal of the projection pattern with the coordinates (x',y') in the captured image and sets a parameter H in the image processor 25. The light spot detector 24 extracts the set of coordinates of the illuminated spot on the projection plane. The image processor 25 performs projective transformation using the corresponding lattice point parameter H on the detected illuminated spot coordinates (x',y') so that the illuminated spot coordinates (x',y') are converted into the coordinates (x,y) of the illuminated spot coordinate in the video image signal. The image processor 25 (illumination image generator) generates illuminated spot image data for the coordinates (x,y). For the illuminated spot image data, for example, a circle having a diameter corresponding to z pixels about the coordinates (x,y) or a previously-registered pointer image may be generated with an arbitrary generating method. The image processor 25 performs calculations for the image generation, generates projection image signals, and transmits the projection image signal to the video image signal transmitter 26. The video image processor 12 of the image projection device 10 superimposes the video image signal generated by the image processor 25 on the video image signal, performs arbitrary image processing, and then outputs a control signal to the drive controller 14. Then, projection image data obtained by superimposing a pointer image is projected from the image projection device 10.

Figure 5:
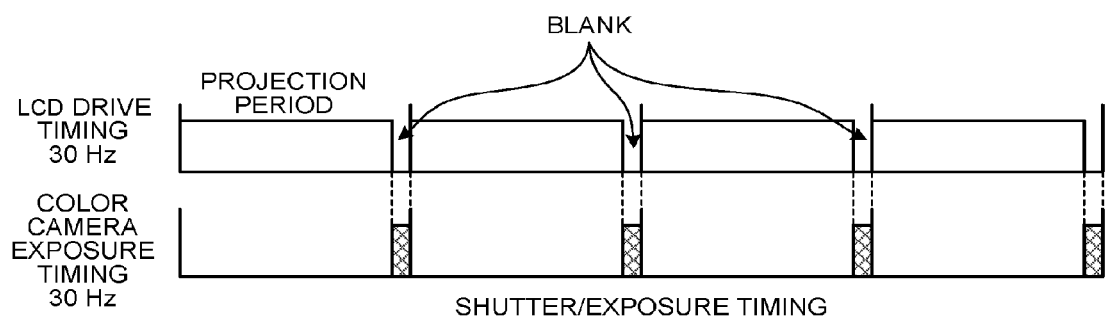
FIG. 5 illustrates the relationship between a period in which an image forming unit is driven, a period in which an image capturing camera captures an image, and the shutter timing of the image capturing camera according to the embodiment.

A method of implementing synchronization with the image data that is projected by the image projection device 10 configured as described above will be described here. FIG. 5 illustrates control on driving of the liquid crystal panels, which serve as the image forming unit 2, and the camera exposure timing. As illustrated in FIG. 5, a period in which the liquid crystal panels transmit light and a period (blank period) in which the liquid crystal panels transmit no light are provided for the period in which each video image frame can be projected. The camera unit 22 performs image capturing by performing exposure in a blank period that is specified by the drive controller 14.

Figure 6:
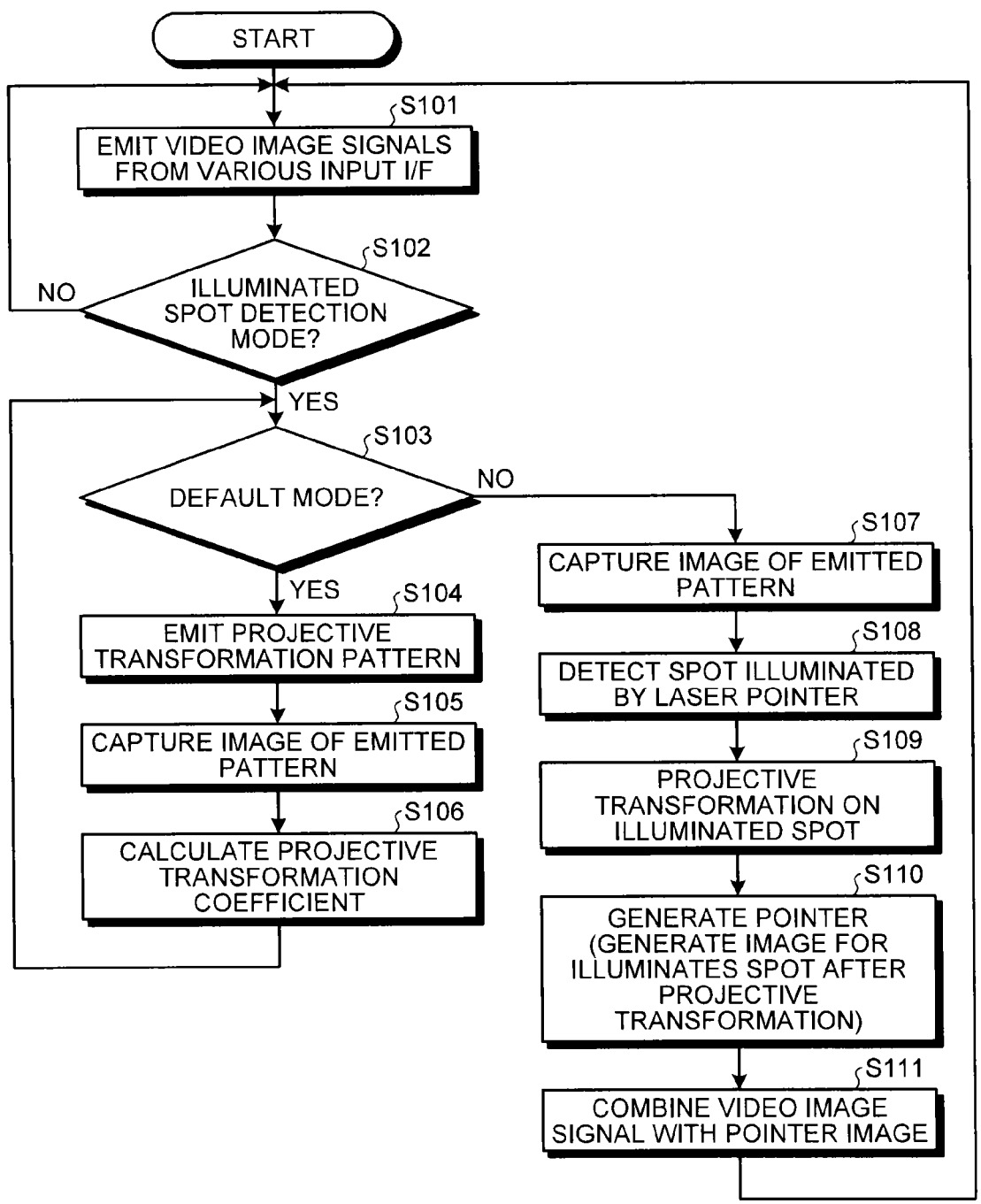
FIG. 6 is a flowchart of the flow of processing for calculating a projective transformation coefficient and for detecting the laser pointer.

The flow of processing for calculating a projective transformation coefficient and for detecting the laser pointer will be described with reference to FIG. 6. The processing illustrated in FIG. 6 is performed on the input video image signal on a frame-by-frame basis. As illustrated in FIG. 6, the drive controller 14 performs processing for emitting video image signals that is input from a video image signal input I/F. (step S101). The drive controller 14 then determines whether or not it is in an illuminated spot detection mode (step S102). In the illuminated spot detection mode, a spot that is illuminated on the screen 30 by the illuminating device is detected. The illuminated spot detection mode is started by, for example, an operation performed by the user on an operation screen or button when using the laser pointer. When it is determined that it is not in the illuminated spot detection mode (NO at step S102), the process returns to step S101 for the next frame of the image signal.

In contrast, when determining that it is in the illuminated spot detection mode, (YES at step S102), the drive controller 14 determines whether or not it is in a default mode (step S103). In the default mode, a projective transformation coefficient is calculated when the projection environment changes. If the illuminated spot detection mode is started at first, it is in the default mode. The determination may be made depending on, for example, whether or not a projective transformation coefficient has been set or whether or not a given time has elapsed after a projective transformation coefficient is set. The projective transformation coefficient is a coefficient for correcting the difference between the coordinates in an image signal before projection and the coordinates in a projected image pattern.

When determining that it is in the default mode (YES at step S103), the drive controller 14 drives the image forming unit 2 etc. to form and illuminate a projective transformation image pattern (see FIG. 4) (step S104). The drive controller 14 then captures an image of the image pattern illuminated by the drive controller 14 according to the synchronization signal (step S105). The image processor 25 then measures the difference between the coordinates in the image of the image pattern, which is captured by the camera unit 22 and input via the video image signal input unit 27, and the coordinates in the data of the image pattern that is illuminated and calculates a projective transformation coefficient with which the sets of coordinates in the two sets of data match each other (step S106). The calculated projective transformation coefficient is saved and the process moves to step S103.

In contest, when determining that it is not in the default mode (NO at step S103), the drive controller 14 captures an image of the illuminated pattern according to the image capturing timing that is specified by the synchronization signal (step S107). The image capturing timing is determined according to the color illuminated by the laser pointer. Thus, the light spot detector 24 can detect the spot illuminated by the laser pointer from the image data of the captured image (step S108). The set of coordinates of the detected illuminated spot is input to the image processor 25 to perform projective transformation with the calculated projective transformation coefficient to convert the set of coordinates of the illuminated spot to the set of coordinates in the image data (step S109). The data of the set of coordinates obtained by the projective transformation is transmitted to the image projection device 10 and the video image processor 12 generates, for the original video image signal to be emitted, image data of the pointer to be combined at the received set of coordinates (step S110) and combines the video image signal with the image data of the pointer (step S111). In other words, projection image data is generated that is obtained by adding a given image according to the position of the detected illuminated spot.

Figure 7:
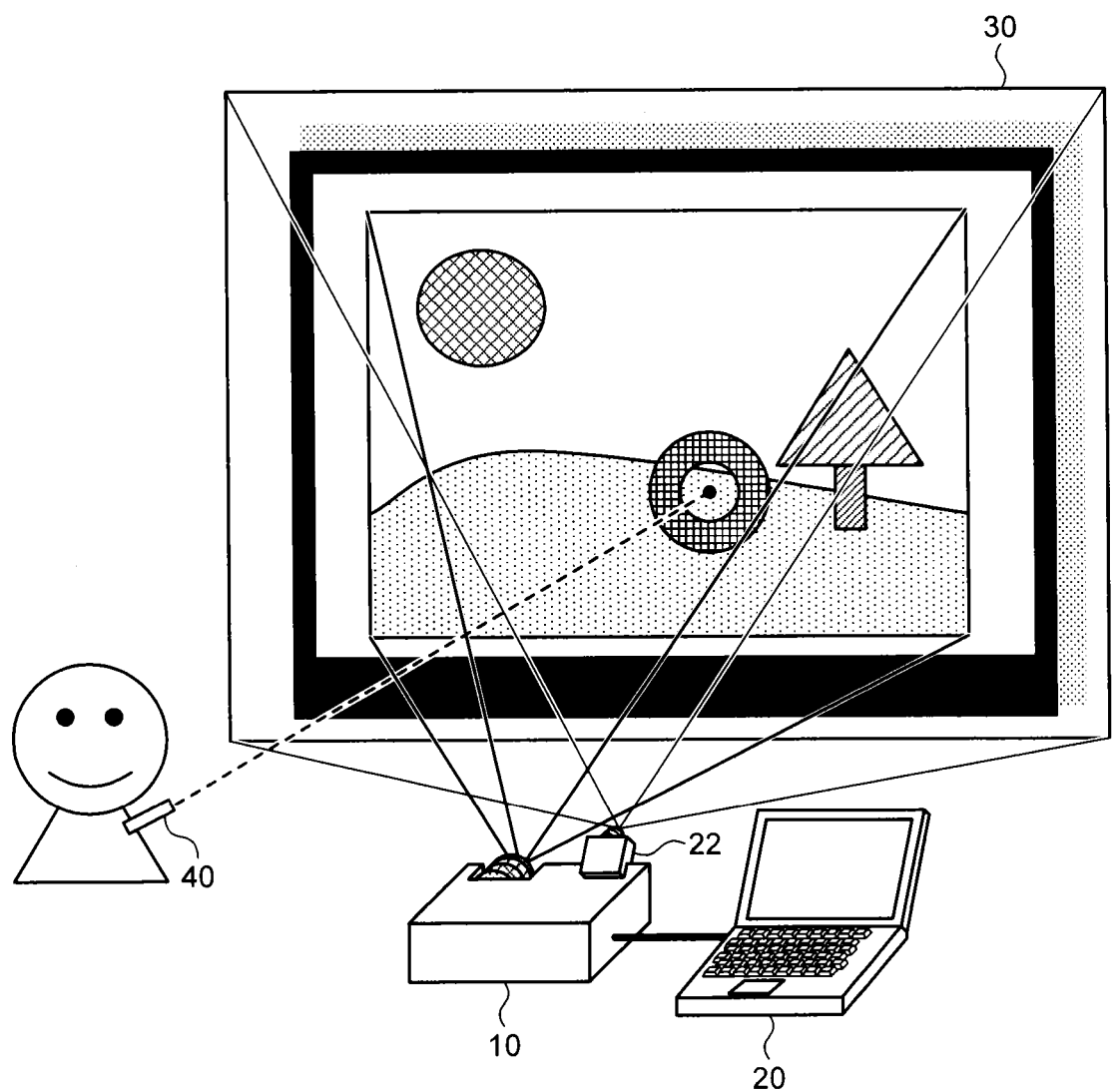
FIG. 7 illustrates a general view of an exemplary mode of emission by the pointer according to the image projection device according to the embodiment.
Figure 8:
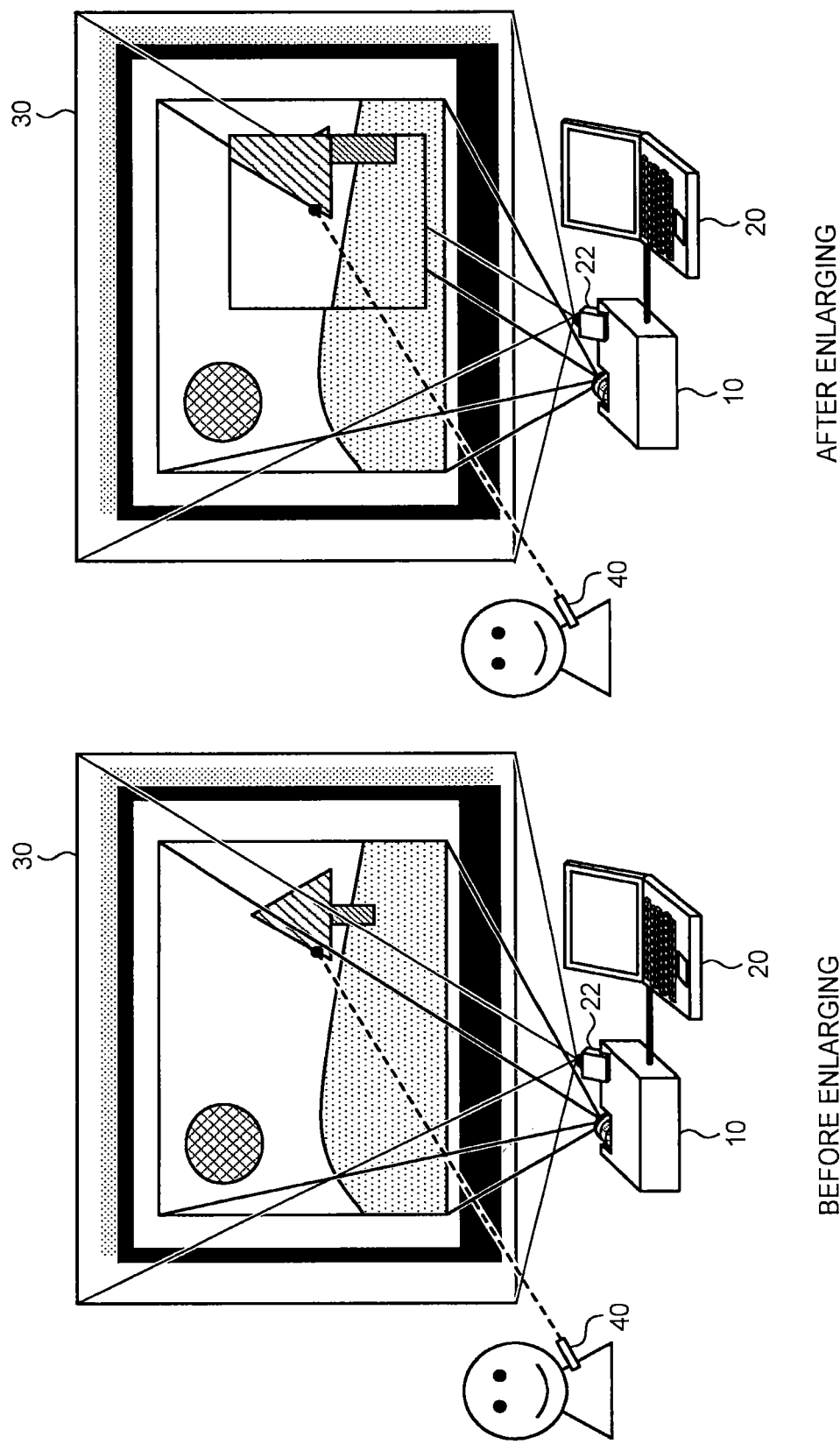
FIG. 8 illustrates a general view of an exemplary mode of emission by the pointer according to the image projection device according to the embodiment.

Regarding the illuminated spot image data of the pointer to be combined, to increase the visibility, the pointer by the laser pointer 40 that is enlarged from the original size about the calculated illuminated spot may be projected as illustrated in FIG. 7. In this case, the pointer is enlarged and thus can be viewed easily on the video image. Alternatively, as illustrated in FIG. 8, instead of enlarging the pointer, the video image processor 12 may perform projection with a part of the image data area enlarged about the calculated coordinates of the illuminated spot and displayed.

Figure 4:
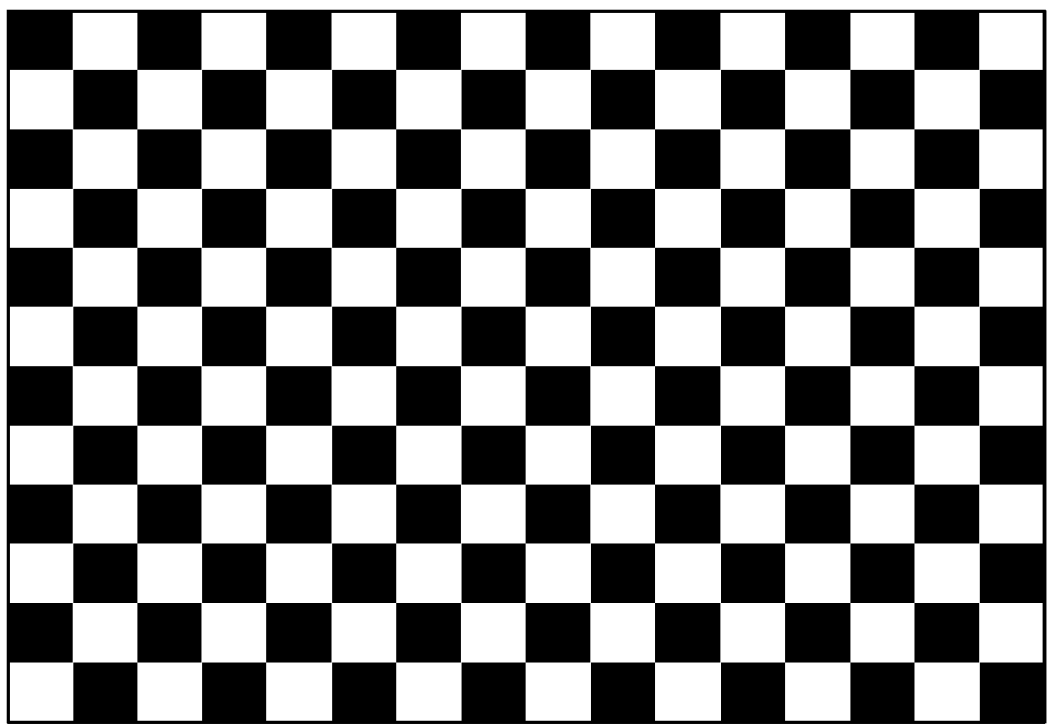
FIG. 4 illustrates an exemplary projection pattern according to the embodiment.

For the projection pattern to be projected to calculate a projective transformation coefficient, for example, in addition to the pattern illustrated in FIG. 4, a grid pattern or dot pattern like that illustrated in FIG. 9 may be used. With a dot projection pattern, even if a projective deformation causes a coordinate shift, accurate coordinates can be obtained by determining the center of gravity. With a grid pattern, a coordinate shift can be reduced and more accurate pattern extraction can be performed if it is expected that there is no disturbance from the ambient light.

The camera unit 22 according to the embodiment is not required to be a built-in unit of the image projection device 10. As illustrated in FIG. 10, the camera unit 22 may be provided in a desired manner, e.g., it may be provided externally (see FIG. 10(*a*)), built-in (see FIG. 10(*b*)), or connected as an external unit (see FIG. 10(*c*)).

Modification

Figure 11:
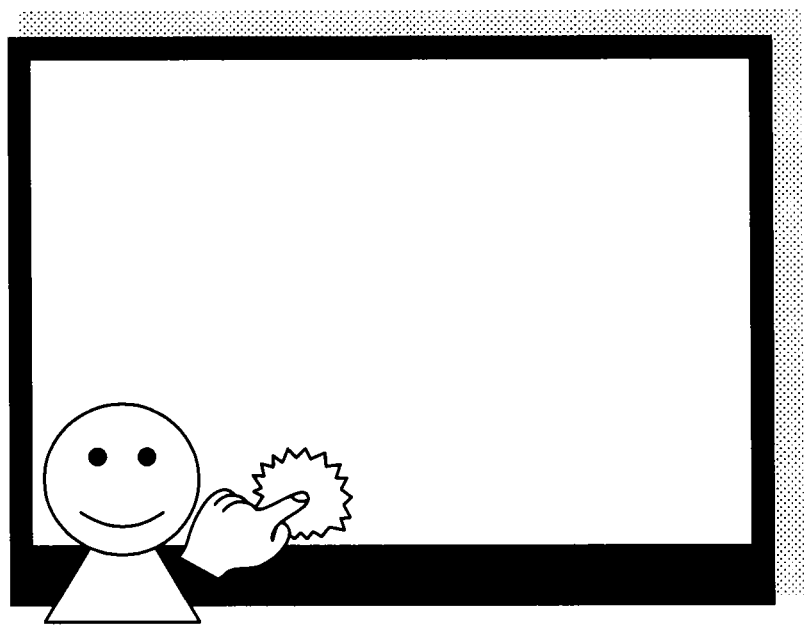
FIG. 11 illustrates an exemplary screen of a modification.

In the above-described embodiment, an image of an illuminated spot on which illuminating light from the illuminating device is incident on the projection plane is captured and image processing is performed according to the spot. Alternatively, a light spot in which a light emitting substance emits light may be detected. FIG. 11 illustrates an exemplary screen of a modification.

For example, a substance (stress illuminant) that emits light when a pushing force (stress) is applied is known. By applying such a substance onto a screen, a screen that emits light in response to a stress (exemplary light spot device that causes a light spot) can be formed. FIG. 11 illustrates that light is emitted in the spot on the screen that is pushed by the user.

In Modification example, the light spot detector 24 detects, instead of the above-described illuminated spot, a light emitting spot (light spot) on the screen as illustrated in FIG. 11. Accordingly, the same processing as that of the embodiment can be implemented.

Figure 12:
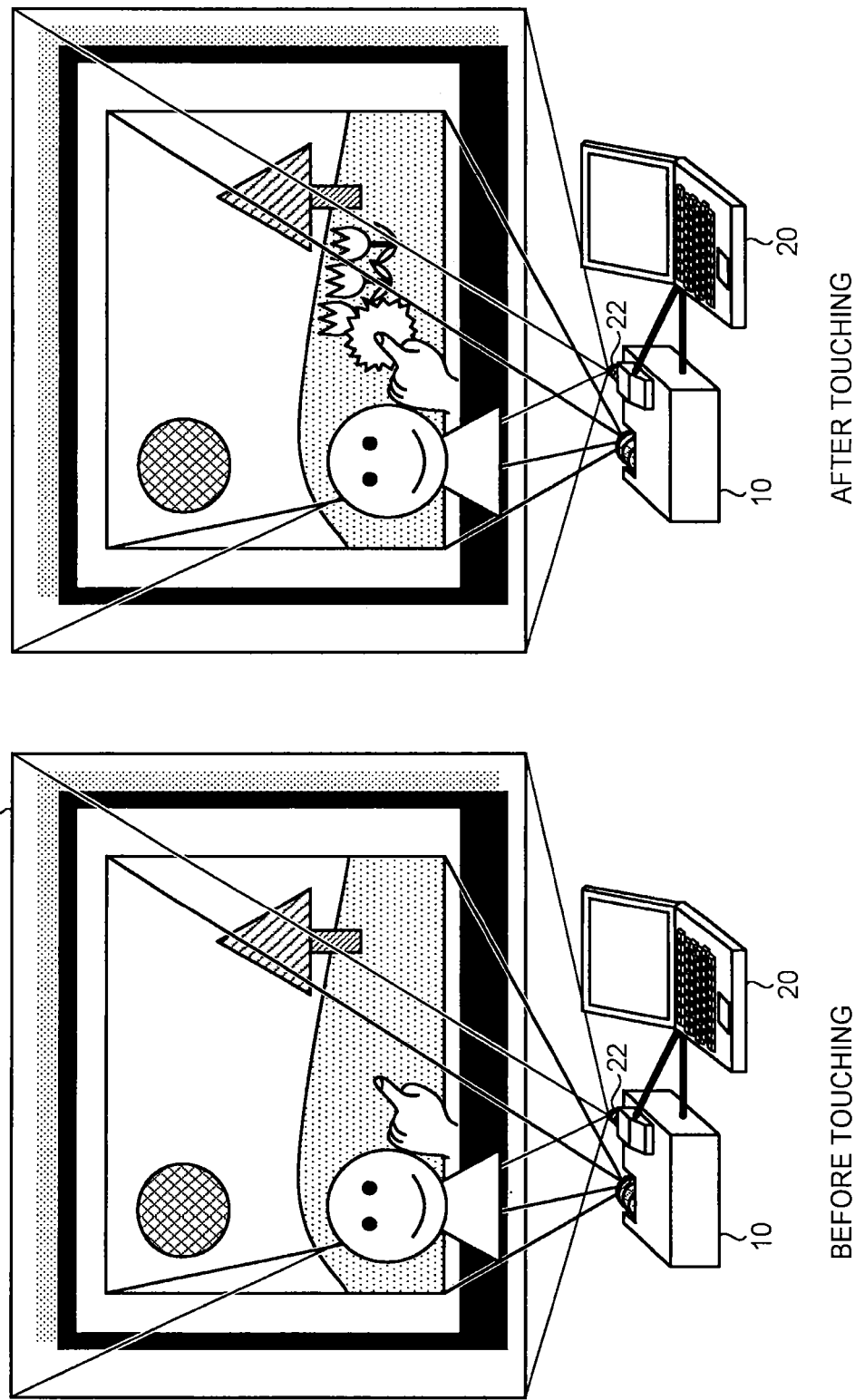
FIG. 12 illustrates an exemplary mode of pointer emission according to an image projection device of a modification.

FIG. 12 illustrates an exemplary mode of pointer emission according to the image projection device of the modification. FIG. 12 illustrates an example where, by performing image processing on a projected image, a new image (an image of flowers shown in FIG. 12) is displayed in a light emitting spot.

Instead of using the light emitting screen, a tool with an LED (Light Emitting Diode) (an exemplary light spot device that causes a light spot), such as a ballpoint pen with a built-in LED, may be used. For example, the light spot detector 24 detects, instead of the above-described illuminated spot, light emission from the ballpoint pen with a built-in LED that emits light when the screen is pushed. Accordingly, the same processing as that of the embodiment can be implemented.

The embodiment of the present invention has been described above. The above-described embodiment is represented as an example only and is not intended to limit the scope of the invention. The invention is not limited to the above-described embodiment and the components can be modified and specified in embodiments within the scope of the invention. By properly combining the components disclosed in the above-described embodiment, various inventions can be formed. For example, some components can be omitted from the whole components shown in the embodiment.

For example, the external PC 20 may implement a part of the units of the image projection device 10. For example, the external PC 20 may include the image capturing controller 21, the camera unit 22, the video image signal input unit 27, the light spot detector 24, the image processor 25, and the video image signal transmitter 26 and the image projection device 10 includes the rest of the units.

A program that is executed by the image projection device according to the embodiment is previously installed in, for example, a ROM and provided. The program that is executed by the image projection device according to the embodiment may be recorded in a computer-readable recording medium, such as a CD-ROM, flexible disk (FD), CD-R, DVD (Digital Versatile Disk), in an installable or executable file and be provided.

Alternatively, the program that is executed by the image projection device according to the embodiment may be stored in a computer that is connected to a network, such as the Internet, and downloaded via the network so as to be provided. Alternatively, the program that is executed by the image projection device according to the embodiment may be provided or distributed via a network, such as the Internet.

The program that is executed by the image projection device according to the embodiment is configured as a module including the above-described units. For practical hardware, a CPU (processor) reads the program from the ROM and executes the program so that the above-described units are loaded and generated in the main storage device. Alternatively, the units of the image projection device 10 may be implemented as software according to a program or implemented as hardware according to a given combination of electronic circuits.

The image projection device according to the embodiment can detect an illuminated spot accurately without being affected by the effect of video image signals.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection device, comprising:
   a drive controller that causes generation of light of a specified color tone by a combination of light to be transmitted by a liquid crystal panel to project image data onto a projection plane;
   a camera configured to capture an image of the image data projected on the projection plane;
   an image capturing controller that receives, from the drive controller, a synchronization signal that specifies a period in which the liquid crystal panel does not transmit light, and causes capturing of the image of the image data projected on the projection plane by the camera according to the period specified by the synchronization signal, wherein a drive frequency to drive the liquid crystal panel is equal to a drive frequency to perform exposure with the camera;
   an illuminated image detector that detects, from the captured image of the image data, an illuminated image that is illuminated by an illuminating device on the projection plane; and
   an illuminated image generator that generates projection image data obtained by superimposing new image data at a position in which the illuminated image is detected.

2. The image projection device according to claim 1, wherein the illuminated image generator generates, at a set of coordinates of the detected illuminated image, an enlarged image of an area of the new image data, the area being determined according to the set of coordinates of the detected illuminated image, as the projection image data.

3. The image projection device according to claim 1, wherein the illuminated image generator generates, at a set of coordinates of the detected illuminated image, an enlarged image of the illuminated image as the new image data.

4. An image projection device, comprising:
   a drive controller that causes generation of light of a specified color tone by a combination of light to be transmitted by a liquid crystal panel to project image data onto a projection plane;
   a camera configured to capture an image of the image data projected on the projection plane;
   an image capturing controller that receives, from the controller, a synchronization signal that specifies a period in which the liquid crystal panel does not transmit light, and causes capturing of the image of the image data projected on the projection plane according to the period specified by the synchronization signal, wherein a drive frequency to drive the liquid crystal panel is equal to a drive frequency to perform exposure with the camera;

a light spot device that generates a light spot around the projection plane from the captured image data by applying a stress onto the projection plane;

a light spot detector that detects the light spot generated by the light spot device around the projection plane; and a light spot image generator that generates projection image data obtained by superimposing new image data at a position in which the light spot is detected.

5. The image projection device according to claim 4, wherein the light spot generator generates, at a set of coordinates of the detected light spot, an enlarged image of an area of the new image data, the area being determined according to the set of coordinates of the detected light spot, as the projection image data.

6. The image projection device according to claim 4, wherein the light spot generator generates, at a set of coordinates of the detected light spot, an enlarged image of the light spot as the new image data.

* * * * *